(12) United States Patent
Wang et al.

(10) Patent No.: US 7,494,511 B2
(45) Date of Patent: Feb. 24, 2009

(54) HYDROPHILIC STAIN RELEASE AGENTS

(75) Inventors: Ying Wang, West Chester, PA (US); Timothy Edward Hopkins, Wilmington, DE (US); Justine Gabrielle Franchina, Hockessin, DE (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 11/429,813

(22) Filed: May 8, 2006

(65) Prior Publication Data

US 2007/0256248 A1 Nov. 8, 2007

(51) Int. Cl.
*D06M 15/576* (2006.01)

(52) U.S. Cl. .................. 8/115.51; 427/393.4; 544/222; 560/160; 560/357

(58) Field of Classification Search .............. 8/192, 8/115.6, 115.51; 442/92; 252/8.75; 427/393.4; 544/222; 560/160, 357
See application file for complete search history.

(56) References Cited

U.S. PATENT DOCUMENTS

| | | | |
|---|---|---|---|
| 3,124,605 A | | 3/1964 | Wagner |
| 4,079,084 A | | 3/1978 | Houghton |
| 4,668,406 A | * | 5/1987 | Chang .................. 252/8.62 |
| 4,695,488 A | | 9/1987 | Hisamoto et al. |
| 4,717,744 A | | 1/1988 | Boutevin et al. |
| 5,410,073 A | * | 4/1995 | Kirchner .................. 560/357 |
| 5,411,766 A | * | 5/1995 | Kirchner .................. 427/393.4 |
| 5,414,111 A | | 5/1995 | Kirchner |
| 5,481,027 A | | 1/1996 | Kirchner |
| 5,509,939 A | | 4/1996 | Kirchner |
| 5,565,564 A | | 10/1996 | Kirchner |
| 5,580,645 A | | 12/1996 | Kirchner |
| 5,773,587 A | | 6/1998 | Lowe et al. |
| 5,844,034 A | | 12/1998 | Grenfell et al. |
| 5,847,134 A | * | 12/1998 | May .................. 544/222 |
| 6,383,633 B1 | | 5/2002 | Allewaert et al. |
| 6,482,911 B1 | | 11/2002 | Jariwala et al. |
| 6,485,789 B1 | | 11/2002 | Allewaert et al. |
| 6,521,730 B1 | | 2/2003 | Pabon et al. |
| 6,890,360 B2 | * | 5/2005 | Cote et al. .................. 8/115.6 |
| 7,056,846 B2 | * | 6/2006 | Clark et al. .................. 442/94 |

FOREIGN PATENT DOCUMENTS

| | | |
|---|---|---|
| EP | 0 435 641 A2 | 3/1991 |
| EP | 846709 A1 | 6/1998 |
| EP | 1225269 B1 | 7/2002 |
| FR | 2777286 | 10/1999 |
| JP | 53134786 | 11/1978 |
| JP | 53134787 | 11/1978 |
| JP | 61023674 | 2/1986 |
| JP | 63027585 | 2/1988 |
| JP | 1994033376 A | 2/1994 |
| JP | 1996120034 A | 5/1996 |
| JP | 2002194264 A | 7/2002 |
| JP | 2004083412 A | 3/2004 |
| JP | 2004143145 A | 5/2004 |
| WO | WO 97/14842 | 4/1997 |
| WO | WO 97/12923 | 10/1997 |
| WO | WO 0119883 | 3/2001 |
| WO | WO 03/048224 A | 12/2003 |

OTHER PUBLICATIONS

Szonyi et al.; New Synthetic Strategy to Vesicle-forming Perfluoroalkylated Amphiphiles; New Journal of Chemistry, 1993, vol. 17 (6), pp. 425-434.
Kawase et al.; SR Modification of Polyester by Novel Acrylate; Nihon Yukagakkaishi, 1996, vol. 45 (3), pp. 259-265; Nihon Yukagaku Gakkai, Japan.
Ishizone et al.; Anionic Polymerizations of Perfluoroalkyl Methacrylates; Polymer Journal (Tokyo), 1999, vol. 31. (11-2), pp. 983-988; Society of Polymer Science, Japan.
Hussain et al.; Poly(ethylene oxide)- and Poly(perfluorohexylethyl methacrylate)- Containing Amphiphilic Block Copolymers: Association Properties in Aqueous Solution; Macromolecular Chemistry and Physics, 2003, 204 (7), pp. 936-946; Wiley-VCH Verlag GMbH & Co. KGaA, Germany.

* cited by examiner

*Primary Examiner*—Lorna M Douyon
*Assistant Examiner*—Khanh Tuan Nguyen

(57) ABSTRACT

A composition comprising a self-emulsifiable or self-dispersible aqueous solution or dispersion of at least one urea linkage-containing alkoxypolyoxyalkylene fluorocarbamate prepared by contacting (a) at least one polyisocyanate which contains at least three isocyanate groups per molecule, (b) at least one fluorochemical reagent of the formula F(CF2)aCH2CH2OH, wherein a is 4, 6, or 8, or mixtures thereof, provided that a is a maximum of 50% of 8, and (c) at least one hydrophilic, water-solvatable reagent which contains per molecule a single functional group which has at least one reactive Zerewitinoff hydrogen atom, and thereafter with (d) water, the equivalent weight of the polyisocyanate and the reagents (b) and (c) being such that the reagents react with 55% to 95% of the isocyanate groups, and water reacts with all of the remaining isocyanate groups, the composition imparting durable hydrophilicity and stain release properties to a substrate treated therewith is disclosed.

15 Claims, No Drawings

HYDROPHILIC STAIN RELEASE AGENTS

FIELD OF THE INVENTION

This invention relates to aqueous compositions comprising fluorochemical agents useful as treating agents to provide hydrophilicity and stain release to fibrous materials.

BACKGROUND OF THE INVENTION

Fabrics and other fibrous substrates are often treated chemically to provide particular surface properties such as repellency, stain resistance soil resistance and the like. Various modifying additives or finishing agents such as softeners, stiffeners, lubricants, and other known additives are also commonly employed to provide a suitable commercial substrate, such as a textile or carpet having the desired surface properties. These modifications typically increase the oleophilicity of the substrate, thereby significantly increasing its tendency to accept oily stains and reducing its ability to release such stains during laundering. While stain resistance helps to inhibit the initial staining of a substrate, once stained, it is important that the substrate have good stain release properties for removal of the stain. Thus, reduction of the stain release properties is undesirable.

Therefore such substrates need to be co-treated with hydrophilic materials to help reduce their oleophilicity and facilitate stain release during laundering. Examples of such materials, which are referred to as stain or soil release agents, include carboxymethylcellulose, polyacrylic acid, or fluorochemical-based systems. U.S. Pat. No. 5,509,939 discloses a process for imparting oil-, water- and stain-repellency and soil-release properties to a substrate which comprises applying to the substrate urea linkage-containing alkoxypolyoxyalkylene fluorocarbamates prepared by reacting (a) at least one polyisocyanate which contains at least three isocyanate groups with (b) at least one fluorochemical reagent which contains one functional group which has at least one H and at least two C atoms each of which contains at least two F atoms, (c) at least one hydrophilic, water-solvatable reagent which contains a single functional group which has at least one reactive H, (d) at least one reagent which contains one reactive H and which on reaction with an isocyanate group yields functionality which has abeyant chemical reactivity with fibrous substrates and (e) then with water, reactants (b), (c) and (d) being reacted with 55% to 95% of said isocyanate groups, and water with the remainder. Preferably said fluorochemical reagent is a perfluoroalkylethyl alcohol mixture of the formula $F(CF_2)_aCH_2CH_2OH$, wherein a is selected from a predominantly 6, 8 and 10 mixture or from a predominantly 8, 10 and 12 mixture.

In recent years demand has increased for more hydrophilic stain release properties than previously provided. It is advantageous to have greater hydrophilicity as it results in easier cleaning of the treated substrate due to enhanced wetability. Higher hydrophilicity also provides better overall moisture management via wicking, which is desirable for textiles used in protective and athletic garments. This demand has typically been met by reformulating the known treatment compositions so as to use greater amounts of surfactants or wetting agents. However, this change in formulation has been found to cause soil pickup, or redeposition of soil onto the textile, during home laundry washing. Thus there is a need for a stain release agent that provides greater hydrophilicity without the need for adding large amounts of surfactants or wetting agents to the composition. The present invention provides such an agent to provide hydrophilicity and stain release to treated substrates.

SUMMARY OF THE INVENTION

The present invention comprises an improved system for importing durable hydrophilicity and durable stain release to a substrate. In a system for imparting surface properties to fibrous substrates employing a composition comprising a self-emulsifiable or self-dispersible aqueous solution or dispersion of at least one urea linkage-containing alkoxypolyoxyalkylene fluorocarbamate prepared by contacting (a) at least one polyisocyanate which contains at least three isocyanate groups per molecule, (b) at least one fluorochemical reagent which contains per molecule a single functional group which has at least one reactive Zerewitinoff hydrogen atom and at least two carbon atoms each of which contains at least two fluorine atoms, and (c) at least one hydrophilic, water-solvatable reagent which contains per molecule a single functional group which has at least one reactive Zerewitinoff hydrogen atom, said hydrophilic, and thereafter with (d) water, the equivalent weight of said polyisocyanate and said reagents (b) and (c) being such that said reagents react with 55% to 95% of said isocyanate groups, and water reacts with all of the remaining isocyanate groups, wherein the improvement comprises use of a fluorochemical reagent of the formula $F(CF_2)_aCH_2CH_2OH$, wherein a is 4, 6, or 8, or mixtures thereof, provided that a is a maximum of 50% of 8, for imparting durable hydrophilicity and durable stain release properties to a substrate treated therewith.

The present invention further comprises a method of imparting durable hydrophilicity and durable stain release to a fibrous substrate comprising contacting the substrate with a composition as described above.

The present invention further comprises a substrate treated with a composition as described above.

DETAILED DESCRIPTION OF THE INVENTION

Trademarks are indicated herein by capitalization.

The present invention comprises a composition for use on fibrous substrates which provides a high level of durable hydrophilicity and also durable stain release to the substrate treated with said composition. The composition of the present invention contains a perfluoroalkylethyl group having a number of carbon atoms selected from 4, 6, or 8, or a mixture thereof, predominantly 4 and 6. A perfluoroalkylethyl group containing 8 carbons is preferably less than about 50% of the perfluoroalkylethyl mixture.

The composition of the present invention comprise compounds which are prepared by the reaction of (1) at least one polyisocyanate which contains at least three isocyanate (NCO) groups per molecule with (2) at least one fluorochemical reagent which contains per molecule a single functional group which has at least one Zerewitinoff reactive hydrogen atom, and two to eight carbon atoms each of which contains at least two fluorine atoms, and 3) at least one hydrophilic, water-solvatable reagent which contains per molecule a single functional group having at least one Zerewitinoff reactive hydrogen atom, and then (4) water.

A Zerewitinoff reactive hydrogen atom is as defined by Zerewitinov in Berichte, 40, 2023 (1907). In Zerewitinoff et al. an active hydrogen-containing organic compound [—OH, —COOH, —NH, etc.] is reacted with a $CH_3Mg$ halide to liberate $CH_4$ which, measured volumetrically, gives a quantitative estimate of the active hydrogen content of the compound. Primary amines give 1 mol of $CH_4$ when reacted in the cold; usually 2 mols when heated [Organic Chemistry by Paul Karrer, English Translation published by Elsevier 1938, page 135]. For purposes of this invention, it is assumed that a primary amine provides one active hydrogen as defined by Zerewitinoff et al.

In particular the fluorochemical reagent (2) is of the formula $F(CF_2)_aCH_2CH_2OH$, wherein a is 4, 6, or 8, or mixtures thereof, provided that a is a maximum of 50% of 8. It has been found that use of such a fluorochemical reagent in the preparation of the composition of the present invention results in the composition providing superior hydrophilicity and stain release to a substrate treated therewith, compared to use of a fluorochemical reagent having a longer chain length perfluoroalkylethyl group containing predominantly 6 to 14 carbon atoms.

The reaction for preparation of the composition of the present invention is carried out in an organic solvent which is chemically inert to the reactant charge and which is subsequently removed and replaced by water to obtain the fluorochemical compound or mixture thereof as a mobile, organic solvent-free, and, stable aqueous dispersion.

Any polyisocyanate, or mixture of polyisocyanates, having three or more isocyanate groups is suitable for use as the first reactant in the present invention. For example, one can use hexamethylene diisocyanate homopolymers having the formula:

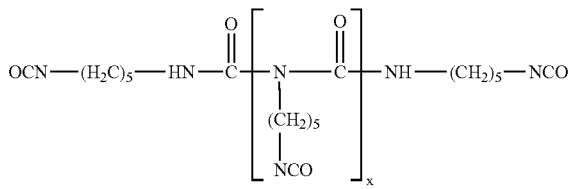

wherein x is an integer equal to or greater than 1, preferably between 1 and 8. Because of their commercial availability, mixtures of such hexamethylene diisocyanate homopolymers are preferred for purposes of this invention. Also suitable for use herein are hydrocarbon diisocyanate-derived isocyanurate trimers which are represented by the formula:

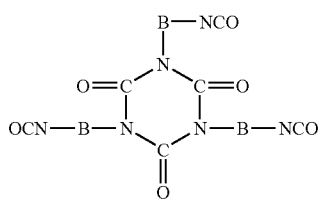

wherein

B is a divalent hydrocarbon group, preferably aliphatic, alicyclic, aromatic or arylaliphatic. For example, B can be hexamethylene (DESMODUR N-3300, Bayer Corporation, Pittsburgh, Pa.), toluene or cyclohexylene (Polyisocyanate IPDI Adduct T 1890/100, Hüls).

Other polyisocyanates useful for the purposes of this invention are those obtained by reacting three mols of toluene diisocyanate with I,I,I-tris-(hydroxymethyl)-ethane or I,I,I-tris(hydroxymethyl)-propane. The isocyanurate trimer of toluene diisocyanate and that of 3-isocyanatomethyl-3,4,4-trimethylcyclohexyl isocyanate are other examples of polyisocyanates useful for the purposes of this invention, as is methine-tris-(phenylisocyanate). Also useful for the purposes of this invention is the polyisocyanate having the following structure:

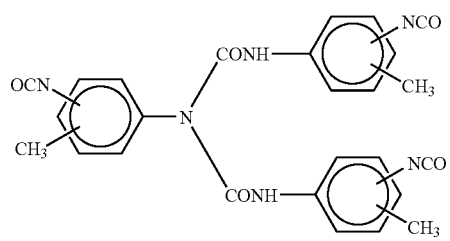

A wide variety of fluorochemical reagents, or mixtures thereof, are useful as the second reactant for the fluorochemical component so long as each contains a single functional group having one or more reactive hydrogen atoms as defined above and two to about eight carbon atoms each of which contains at least two fluorine atoms. It is advantageous for the fluorochemical reagent, or mixture thereof, to contain more than two fluorine saturated carbon atoms; however, since the fluorine content of the final product is in part dependent on the fluorine content of the fluorochemical reagent per se and on the number of fluorochemical moieties incorporated therein. A preferred fluorochemical reagent (2) is a perfluoroalkylethyl alcohol of the formula $F(CF_2)_aCH_2CH_2OH$, wherein a is 4, 6 or 8, or a mixture thereof. Preferably a is predominantly 4 and/or 6, or mixtures thereof. When a is 8, preferably it is fifty percent or less of the perfluoroalkylethyl mixture. When compared to a fluorochemical reagent which is a perfluoroalkylethyl alcohol mixture of the above formula wherein a predominantly ranges from 6 to 14, it has been found that the shorter chain length perfluoroalkylethyl group provides increased hydrophilicity and durable stain release to substrates treated therewith.

A large number and variety of hydrophilic, water-solvatable materials can be used as the third reactant in the preparation of products of this invention. However, in order to prepare the fluorochemical compounds of the present invention, it is essential that the water-solvatable, hydrophilic materials contain per molecule a single functional group having at least one Zerewitnoff active hydrogen atom. The resulting fluorochemical products are stable aqueous dispersions and compatible with commercial fabric finish bath formulations.

In a preferred embodiment, the hydrophilic water-solvatable component (3) is at least one ethylene oxide (EO) or ethylene oxide/propylene oxide (PO) derived polymer of the general formula

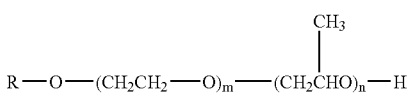

wherein

R is a monovalent hydrocarbon radical containing no more than six aliphatic or alicyclic carbon atoms; m and n are the average number of repeating oxyethylene (EO) and oxypropylene (PO) groups, respectively; provided that m is always a positive integer, while n is a positive integer or zero (designating an EO homopolymer in the latter case). More preferably, the hydrophilic, water-solvatable components (3) are commercially available methoxypolyethylene glycols (MPEG's), or mixtures thereof, having an average molecular weight equal to or greater than about 200, and most preferably between 350 and 2000. Also commercially available and suitable for the preparation of the polyfluoro organic compounds of the present invention are butoxypolyoxyalkylenes containing equal amounts by weight of oxyethylene and oxypropylene groups (Union Carbide Corp. 50-HB Series UCON Fluids and Lubricants) and having an average molecular weight greater than about 1000. For best performance the composition of the present invention has a molar ratio x:y of fluorochemical component (b) to water solvatable component (c) such that x is a maximum of about 2 when y is 1 when the component (c) has a molecular weight of about 550 or less. This molar ratio is such that x is a maximum of about 3 when y is 1 when the component (c) has a molecular weight of about 750. For higher molecular weights of component (c) higher molar ratios of component (b) to component (c) can be employed, for example x is 10 or more when y is 1. For component (c) having a very high molecular weight, there may be a tendency toward gelling during the reaction. However, this is easily avoided by using a mixture of very high molecular weight and low molecular weight components (c).

The reaction of water with the residual isocyanate groups effectively increases the average molecular weight of the derived product mixture and the probability that each product moiety will have fluorochemical, hydrophilic/water-solvatable properties. The fluorochemical compositions of the present invention are prepared by reacting: (1) at least one polyisocyanate or mixture of polyisocyanates which contains at least three NCO groups per molecule with a stoichiometric deficiency of (2) at least one fluorochemical compound which contains per molecule (a) a single functional group having one or more reactive Zerewitinoff hydrogen atoms and (b) at least two carbon atoms each of which contains at least two fluorine atoms, (3) at least one hydrophilic, water-solvatable compound which contains per molecule a single functional group having at least one reactive Zerewitinoff hydrogen atom, and then (4) water.

In one embodiment, fluorochemical compositions of the present invention have been prepared by the sequential catalyzed reaction of DESMODUR N-100, DESMODUR N-3200 or DESMODUR N-3300, or mixtures thereof, with a stoichiometric deficiency of a perfluoroalkyl compound containing one functional group, a methoxypolyethylene glycol, and then with water. DESMODUR N-100 and DESMODUR N-3200 are hexamethylene diisocyanate homopolymers commercially available from Bayer Corporation, Pittsburgh, Pa. Both presumably are prepared by the process described in U.S. Pat. No. 3,124,605 and presumably to give mixtures of the mono, bis, tris, tetra and higher order derivatives.

| Typical Properties | Ave. Equivalent Weight | NCO Content, % |
| --- | --- | --- |
| DESMODUR N-100 | 191 | 22.0 |
| DESMODUR N-3200 | 181 | 23.2 |

The typical NCO content of DESMODUR N-100 approximates that listed for a SRI International. Report (Isocyanates No. 1D, July, 1983, Page 279) hexamethylene diisocyanate homopolymer with the following composition:

| Product Composition | Wt. % |
| --- | --- |
| Diisocyanate | 0.1 |
| Monobiuret | 44.5 |
| Bisbiuret | 17.4 |
| Trisbiuret | 9.5 |
| Tetrabiuret | 5.4 |
| Higher Mol. Wt. Derivatives | 23.1 |
| NCO Content | 21.8 |

The fluorochemical compositions of the present invention are typically prepared by first charging to a reaction vessel the polyisocyanate (1), the fluorochemical component (2), the hydrophilic, water-solvatable compound (3), and a dry, organic solvent such as methylisobutylketone (MIBK).

The order of reagent addition is not critical. The specific weight of the polyisocyanate and other reactants charged is based on their equivalent weights and on the working capacity of the reaction vessel and is adjusted so that all Zerewitinoff active hydrogens charged will react with some desired value between about 55% and about 95% of the total NCO group charge. The weight of dry solvent is typically 15-30% of the total charge weight. The charge is agitated and temperature adjusted to 40°-70° C. A catalyst, typically Tyzor TPT (available from E.I. du Pont de Nemours and Company, Wilmington, Del.) per se, or as a solution in an organic solvent, is added to promote the latter reactions in an amount which depends on the charge, but is usually small, e.g. 1 to 2 parts per 10,000 parts of the polyisocyanate. After the resultant exotherm, the mixture is agitated at about 95° C. for 2-20 hours, preferably 2-4 hours from the time of catalyst addition. The reaction mixture is solvent diluted to a solids content of about 70%, treated with sufficient water to react with the residual NCO groups, and agitated at 60°-95° C. until the reaction tests negative for isocyanates (usually 1-24 hours). The resultant product can be stored and/or used as prepared or after further solvent dilution. It is preferably converted to an organic solvent-free aqueous dispersion.

The use of a stoichiometric excess of a polyisocyanate assures complete reaction of the fluorinated and nonfluorinated organic compounds; that coupled with subsequent reaction with water provides products of this invention which posses enhanced properties when compared to those of the prior art, particularly when used to treat washable fabrics. In addition, those aspects of the invention eliminate any need to remove any unreacted organic compound. It thus provides a substantial process advantage; it also provides greater product purity and uniformity. In the Examples that follow, a polyisocyanate containing at least three NCO groups is reacted with a stoichiometric deficiency of a fluorochemical reagent, and a hydrophilic water solvatable reagent. The subsequent reaction of water with the residual NCO groups yields urea group linked products of the present invention.

Water reacting by either of the two pathways acts as a dual functional Zerewitinoff active hydrogen compound. It is convenient to describe the amount of water added to the synthesis mixture for the second stage reaction sequence in terms of the number of active hydrogen atoms added per number of residual NCO groups, i.e., as a ratio. The theoretical water ratio required to satisfy the stoichiometry of either pathway is at least 1:1.

The composition of the present invention optionally further comprises additional components such as treating agents or finishes to achieve additional surface effects, or additives commonly used with such agents or finishes. Such additional components comprise compounds or compositions that provide surface effects such as no iron, easy to iron, shrinkage control, wrinkle free, permanent press, moisture control, softness, strength, anti-slip, anti-static, anti-snag, anti-pill, stain repellency, stain release, soil repellency, soil release, water repellency, oil repellency, odor control, antimicrobial, sun protection, and similar effects. One or more such treating agents or finishes can be combined with the blended composition and applied to the fibrous substrate. Other additives commonly used with such treating agents or finishes may also be present such as surfactants, pH adjusters, cross linkers, wetting agents, wax extenders, and other additives known by those skilled in the art. Further, extender compositions and blocked isocyanates are optionally included to obtain a combination of benefits.

The present invention further comprises a method of imparting durable hydrophilicity and durable stain release to a fibrous substrate comprising contacting said substrate with a composition of the present invention as described above. The compositions of the present invention are applied to suitable substrates by a variety of customary procedures. For application to washable apparel fabrics, the compounds of the present invention are applied, for example, from an aqueous dispersion or an organic solvent solution by brushing, dipping, spraying, padding, roll-coating, foaming or the like. The compositions of this invention are applied to the substrate as such or in combination with other textile or fluoro-finishes, processing aids, lubricants, antistatic agents, and the like as described above. The compounds can also be blended with other agents which have oil/water repellency and soil release properties and applied to fibers or fabrics. They are applied to dyed and undyed fibrous substrates.

The present invention further comprises substrates treated with the above described composition of the present invention, or in accordance with the above described method of the present invention. Suitable substrates for the application of the compositions of this invention are fibrous substrates. These include fibers, yarns, fabrics, filaments, textiles and other fibrous substrates. Such substrates are derived from natural, modified natural, or synthetic polymeric materials or from blends of these other fibrous materials and other porous materials which will absorb and transport low surface tension liquids either on their surfaces or in their interstices by capillary action. Specific representative examples are cotton, silk, regenerated cellulose, nylon, fiber-forming polyesters, fiber-forming polyacrylonitrile, cellulose nitrate, cellulose acetate, ethyl cellulose, paper, wood pressed or otherwise hardened wood composites, and the like. Dyed and undyed cotton sateen, poplin, broadcloth, jean cloth, denim, gabardine and the like are especially adaptable for treatment with the compositions of this invention to provide products having oil enhanced hydrophilicity and stain release properties and which are also relatively unaffected by the action of heat, air and light.

The compositions and method of the present invention are useful to provide to substrates treated with such compositions and method having a high level of durable hydrophilicity while also retaining a high portion of stain release properties after laundering and dry cleaning. The enhanced hydrophilicity and the durable stain release provide for easier cleaning of treated substrates due to increased wetting of the substrate. The hydrophilicity is especially useful in treated textile substrates of the present invention for use in protective and athletic garments. The hydrophilicity is enhanced over the levels provided by prior art treatments, and provides moisture management in such garments via wicking away of moisture from the wearer. This enhanced hydrophilicity is provided with no decrease in stain release, as experienced with many prior art treatments. The durability of the hydrophilicity and stain release results in the textile retaining these properties throughout a longer time period when subjected to periodic laundering or cleaning.

Test Method 1—Fabric Treatment

The fabric was treated with the water based fluorinated polymer formulation using a conventional pad bath (dipping) process. A bath containing 30-50 g/L of the fluorinated polymer-treating agent was used. After application, the fabrics were cured at approximately 165° C. for 2 minutes, and allowed to "rest" after treatment and cure.

Test Method 2—Wicking Test

For the wicking testing, 5 drops of DI water were placed on the cotton samples on different areas of the material. The time (in seconds) it took to completely absorb into the cotton was timed. If the drop had not been absorbed within 180 seconds, the test was rated as a failure. The wicking time is an indication of hydrophilicity. A faster wicking time indicates higher hydrophilicity.

Test Method 3—Stain release evaluation:

The stain release test was taken from the MTCC Test Method 130-1995. Five drops of either mineral oil or corn oil were placed in the center of each treated cotton sample on a piece of blotter paper. A piece of glassine paper (weighing paper) was placed over the spot and a five-pound weight was placed on top of the paper. After 60 seconds, the weight and glassine paper were removed. Four red dots were marked around the oil spot. The cotton samples were placed in the Kenmore washing machine with the following settings of Large load, Warm (100° F., 38° C.)/Cold, One rinse, Ultra Clean (setting 12), and Normal (fast/slow). 100 g of AATCC WOB detergent and 4 lbs. of material including ballasts were added to the wash machine. After washing, the samples were placed in the Kenmore dryer on the high setting for 45 minutes. The samples were rated based on the Stain Release Replica Grades below.

Stain Release Grades:

| | |
|---|---|
| Grade 5 | Stain equivalent to Standard Stain 5 |
| Grade 4 | Stain equivalent to Standard Stain 4 |
| Grade 3 | Stain equivalent to Standard Stain 3 |
| Grade 2 | Stain equivalent to Standard Stain 2 |
| Grade 1 | Stain equivalent to Standard Stain 1 |

Grade 5 represented the best stain removal and grade 1 the poorest stain removal.

Test Method 4—Wash Durability

The fabric samples were laundered according to International Standard specifies domestic washing procedure for textile testing. Fabric samples were loaded into a horizontal drum, front-loading type (Type A, WASCATOR Fom71MP-Lab) of automatic washing machine with a ballast load to give a total dry load of 4 lb. A commercial detergent was added (AATCC 1993 standard Reference Detergent WOB) and the washer programmed with high water level with warm water (105° F., 41° C.), 15 minutes normal wash cycle followed by 2 times 13 minutes rinse and then 2 minutes spin dry. The sample and ballast were washed a designated number of times (5 HW for 5 washes, 20 HW for 20 washes etc.). After washing, the samples were placed in the Kenmore dryer on the high setting for 45 minutes. The samples were then tested following the Test Methods 2 and 3 for wicking and stain release evaluation.

The following materials were used in the Examples unless otherwise indicated:

1) Methoxypolyethylene glycol (MPEG) 2000 available from Sigma-Aldrich, Milwaukee, Wis.

2) CARBOWAX (MPEG) 350, 550, 750, 950 and 1200, available from Union Carbide Co; Danbury, Conn.

3) DESMODUR N100, available from Bayer Corporation, Pittsburgh, Pa. The moles of DESMODUR N100 represent the moles of NCO functionality in the experiments (42 g/mol).

4) TYZOR TPT, catalyst, available from E.I. du Pont de Nemours and Company, Wilmington, Del.

EXAMPLE 1

A three-neck, 1 L round-bottom flask was equipped with a reflux condenser with a nitrogen inlet, a temperature probe, an addition funnel, and a TEFLON-coated magnetic stirring bar. The reaction vessel was charged with methoxy polyethylene glycol 750 (45 g, 60 mmol), 3,3,4,4,5,5,6,6,7,7,8,8,8-tridecafluorooctan-1-ol (41.7 g, 115 mmol) and DESMODUR N100 (82.3 g, 63% in methyl isobutyl ketone (MIBK), 270 mmol). The colorless reaction mixture was heated to 65° C. until the temperature stabilized. To this, 3.3 g of Tyzor TPT solution (5% Tyzor TPT in MIBK) was added slowly through the addition funnel, followed by stirring at 95° C. for 3 hours. To the flask, 40 g MIBK and 16 g water was added and the temperature was held at 75° C. for 4 hours. An additional 295 g of water was added and the mixture was stirred at 78° C. for 30 minutes or until no isocyanate was detected. The solution was homogenized using a digital sonifier for 5 minutes and MIBK was removed via vacuum distillation to yield a dispersion that was 30.2% solids and 5.67% Fluorine.

The dispersion was applied to 100% cotton fabric using Test Method 1. The fabric was evaluated for wicking using Test Method 2, stain release using Test Method 3, and durability using Test Method 4. Results are listed below in Table 1.

EXAMPLE 2

The procedure of Example 1 was employed except for using 3,3,4,4,5,5,6,6,6-nonafluorohexan-1-ol (30.2 g, 0.115 mol) in place of 3,3,4,4,5,5,6,6,7,7,8,8,8-tridecafluorooctan-1-ol. The resulting dispersion was 33.4% solids and 4.26% Fluorine.

The dispersion was applied to 100% cotton fabric using Test Method 1. The fabric was evaluated for wicking using Test Method 2, stain release using Test Method 3, and durability using Test Method 4. Results are listed below in Table 1.

COMPARATIVE EXAMPLE A

The procedure of Example 1 was employed but using a perfluoroalkylethyl alcohol mixture of the formula $F(CF_2)_a CH_2CH_2OH$, wherein a ranged from 6 to 14, and a was predominantly 6, 8 and 10. The typical mixture was as follows: 27% to 37% of a=6, 28% to 32% of a=8, 14% to 20% of a=10, 8% to 13% of a=12, 3% to 6% of a=14.

The dispersion was applied to 100% cotton fabric using Test Method 1. The fabric was evaluated for wicking using Test Method 2, stain release using Test Method 3, and durability using Test Method 4. Results are listed below in Table 1.

TABLE 1

| | Example | | | | |
|---|---|---|---|---|---|
| | Comp Ex. A | Ex. 1, test 1 | Ex. 2, test 1 | Ex. 1* test 2 | Ex. 2* test 2 |
| Carbon chain** Wicking (sec) | 6-14 | 6 | 4 | 6 | 4 |
| Initial | 130 | 4 | 5 | 1 | 5 |
| After 5HW*** Stain Release- Initial | 1 | 1 | 1 | 0 | 1 |
| Mineral oil | 5 | 4+ | 3 | 4+ | 2 |
| Corn Oil Stain Release- after 5HW*** | 4+ | 4+ | 4 | 4 | 4 |
| Mineral Oil | 5 | 5 | 5 | 4 | 4 |
| Corn Oil | 5 | 4 | 4 | 3+ | 5 |

*All bath concentrations for the testing were 30 g/L except test 2 was at 15 g/L loading.
**Perfluroralkylethyl carbon chain length.
***5HW indicates 5 washing laundry processes per Test Method 4.

Replacing the component (b) fluorochemical perfluoroalkyl group having a homologue distribution of a mixture of 6 to 14 carbons of Comparative Example A with a perfluoroalkyl group of six carbons (Example 1), or four carbons (Example 2), the polyurethane formulation gave good hydrophilic stain release, with ratings of 1 to 5 seconds initial wicking time, compared to the control rating of 130 seconds wicking time using the homologue mixture. The decrease in initial wicking time indicated an increase in hydrophilicity. Even with 50% loading of Examples 1 and 2, the stain release property was still comparable.

EXAMPLE 3

A three-neck, 1 L round-bottom flask was equipped with a reflux condenser with a nitrogen inlet, a temperature probe, an addition funnel, and a TEFLON-coated magnetic stirring bar. The reaction vessel was charged with 3,3,4,4,5,5,6,6,6-nonafluorohexan-1-ol (1.52 g, 5.77 mmol), 3,3,4,4,5,5,6,6,7,7,8,8,8-tridecafluorooctan-1-ol (2.1 g, 5.77 mmol), methoxy polyethylene glycol 750 (4.5 g, 6.0 mmol), 0.3 g of the Tyzor TPT solution catalyst, and DESMODUR N100 (8.2 g, 63% in MIBK, 27 mmol) were used. The reaction was heated for 3 hours at 95° C. After the deionized water was added (1.6 g. 89 mmol) the reaction was heated at 95° C. until there was no isocyanate present, as detected using a Colormetric Technologies, Inc isocyanate test strip—the solution was heated for 7 hours and an additional 12 hours at 75° C. Homogenization was performed as described in Example 1 giving a final product that was 15.7% solids and 3.08% F.

The dispersion was applied to 100% cotton fabric using Test Method 1. The fabric was evaluated for wicking using Test Method 2, stain release using Test Method 3, and durability using Test Method 4. Results are listed below in Table 2.

EXAMPLE 4

The procedure of Example 3 was employed using 3,3,4,4,5,5,6,6,6-nonafluorohexan-1-ol (1.0 g, 3.79 mmol), 3,3,4,4,5,5,6,6,7,7,8,8,8-tridecafluorooctan-1-ol (2.8 g, 7.69 mmol), methoxy polyethylene glycol 750 (4.5 g, 6.0 mmol), 0.3 g of the TYZOR TPT solution catalyst, and DESMODUR N100 (8.2 g, 63% in MIBK, 27 mmol) and an overhead stirrer instead of a magnetic stirrer. The reaction was heated for 4 hours at 95° C. To the flask, 1.6 g of water and MIBK was added and the reaction was heated for 14 hours at 95° C. until there was no isocyanate present, as detected using a Colormetric Technologies, Inc isocyanate test strip. Workup as described above in Example 1 gave a stable dispersion (17.9% solids, 2.76% F).

The dispersion was applied to 100% cotton fabric using Test Method 1. The fabric was evaluated for wicking using Test Method 2, stain release using Test Method 3, and durability using Test Method 4. Results are listed below in Table 2.

TABLE 2

|  | Examples | | | |
| --- | --- | --- | --- | --- |
|  | Ex. 3 | Ex. 3 | Ex. 4 | Ex. 4 |
| Ratio of $C_4$:$C_6$* | 1:1 ratio | 1:1 ratio | 1:2 ratio | 1:2 ratio |
| Fluorine % in treatment bath | 0.0824 | 0.1541 | 0.0828 | 0.1518 |
| Wicking test, sec. | | | | |
| Initial | 6 | 12 | 5 | 10 |
| 5HW** | 2 | 4 | 2 | 4 |
| Stain Release-Initial | | | | |
| Mineral oil | 2 | 5 | 5 | 5 |
| Corn Oil | 5 | 3+ | 3 | 5 |
| Stain Release-5HW** | | | | |
| Mineral Oil | 2 | 2+ | 2 | 2 |
| Corn Oil | 1+ | 2 | 4 | 3 |

*Ratio of component (b) perfluoroalkyl group having 4 carbons to that having six carbons in the mixture of homologues.
**5HW indicates 5 washing laundry processes per Test Method 4.

The data in Table 2 shows that a mixture of 4 and 6 carbon perfluoroalkyl chain homologues in the formulation achieved low wicking times, indicating high hydrophilicity at different levels of percent fluorine used in the bath for treating the cotton substrates, and also durable stain release. The examples containing a lower percent fluorine provided superior hydrophilicity, and comparable stain release to those having a higher percent fluorine.

COMPARATIVE EXAMPLE B

The procedure of Example 1 was employed using 3,3,4,4,5,5,6,6,7,7,8,8,9,9,10,10,10-heptadecafluorodecan-1-ol (53.1 g, 114.4 mmol) in place of 3,3,4,4,5,5,6,6,7,7,8,8,8-tridecafluorooctan-1-ol. The stable dispersion was at 32% solids and 7.41% F.

The dispersion was applied to 100% cotton fabric using Test Method 1. The fabric was evaluated for wicking using Test Method 2, stain release using Test Method 3, and durability using Test Method 4. Results are listed below in Table 3.

EXAMPLE 5

The procedure of Comparative Example B was employed using 3,3,4,4,5,5,6,6,7,7,8,8,8-tridecafluorooctan-1-ol (20.8 g, 57.1 mmol) and 3,3,4,4,5,5,6,6,7,7,8,8,9,9,10,10,10-heptadecafluorodecan-1-ol (26.6 g, 57.3 mmol) as the fluorinated alcohols. The dispersion was stable (35.1% solids, 6.73% F).

The dispersion was applied to 100% cotton fabric using Test Method 1. The fabric was evaluated for wicking using Test Method 2, stain release using Test Method 3, and durability using Test Method 4. Results are listed below in Table 3.

COMPARATIVE EXAMPLE C

The procedure of Comparative Example B was employed using 3,3,4,4,5,5,6,6,7,7,8,8,8-tridecafluorooctan-1-ol (10.4 g, 28.6 mmol) and 3,3,4,4,5,5,6,6,7,7,8,8,9,9,10,10,10-heptadecafluorodecan-1-ol (39.8 g, 85.8 mmol) as the fluorinated alcohols. The dispersion was stable (34.2% solids, 7.92% F).

The dispersion was applied to 100% cotton fabric using Test Method 1. The fabric was evaluated for wicking using Test Method 2, stain release using Test Method 3, and durability using Test Method 4. Results are listed below in Table 3.

EXAMPLE 6

The procedure of Comparative Example B was employed using 3,3,4,4,5,5,6,6,7,7,8,8,8-tridecafluorooctan-1-ol (31.2 g, 85.7 mmol) and 3,3,4,4,5,5,6,6,7,7,8,8,9,9,10,10,10-heptadecafluorodecan-1-ol (13.3 g, 28.7 mmol) as the fluorinated alcohols. The dispersion was stable (33.1% solids, 6.75% F).

The dispersion was applied to 100% cotton fabric using Test Method 1. The fabric was evaluated for wicking using Test Method 2, stain release using Test Method 3, and durability using Test Method 4. Results are listed below in Table 3.

TABLE 3

|  | Example | | | |
| --- | --- | --- | --- | --- |
|  | Comp. Ex. B | Ex. 5 | Comp. Ex. C | Ex. 6 |
| No. of carbons in perfluoroalkyl homolog chain | C8 | C6:C8, 1:1 ratio | C6:C8, 1:3 ratio | C6:C8, 3:1 ratio |
| Wicking, sec. | | | | |
| Initial | >180 | 15 | >180 | 8 |
| 5HW* | 8 | 1 | 3 | 1 |
| Stain Release-Initial | | | | |
| Mineral oil | 4+ | 5 | 5 | 5 |
| Corn Oil | 4+ | 4+ | 4 | 4+ |
| Stain Release-5HW* | | | | |
| Mineral Oil | 5 | 4+ | 4+ | 4+ |
| Corn Oil | 4+ | 4+ | 4+ | 4+ |

*5HW indicates 5 washing laundry processes per Test Method 4. Testing results in Table 3 were on white Avondale cotton.

The data in Table 3 showed that with increasing content of shorter chain lengths (6 carbons) in the perfluoroalkyl group as in Example 5 (C 6=50%, C8=50%) and Example 6 (C6=75%, C8=25%), hydrophilicity increased as demonstrated by the decrease in wicking time compared to Comparable Example B (C8=100%) and Comparative Example C(C6=25%, C8=75%), while the stain release property remained comparable. Example 5 vs Comparative Example C suggested that at least 50% of C6 should be present to maintain the increased hydrophilicity.

COMPARATIVE EXAMPLE D

A four-neck 500 mL flask, first dried, then equipped with a nitrogen purge, stirrer, water condenser, heating mantle and thermocouple was charged with DESMODUR N100 (53.1 g, 63% in MIBK, 174 mmol), melted CARBOWAX (MPEG) 1200 (56 g, 46.7 mmol), and a melted fluorinated alcohol having the formula $F(CF_2)_a CH_2 CH_2 OH$ (25 g, 51.33 mmol), (a=4, 6, 8, 10, 12, 14, 16, and 18 in the respective relative amounts of about 1%, 38%, 30%, 16%, 10% 4% and 2%, said monomer having a weight average molecular weight of 487).

Then the temperature was set to 55° C. with agitation (150 RPM) and a nitrogen blanket was introduced. Once the temperature was stabilized at 55° C., the "catalyst" solution, dibutyl tin dilaurate (0.04%, available from Aldrich Chemical Company, Milwaukee, Wis.) made with dry MIBK, was added. The temperature was increased to 90° C. and held for three hours. The temperature was dropped to 85° C.; 25 g of MIBK and 10 g of hot water, approximately 80° C., was added. After the addition the temperature was dropped to 75° C. and held for four hours. Then 173 g of hot water, approximately 80° C., was added. The solution is stirred for 30 minutes. The MIBK was removed through distillation under vacuum; the temperature was maintained between 55 and 65° C. Final dispersion weighed 212 g with 30% solids.

The dispersion was applied to 100% cotton fabric using Test Method 1. The fabric was evaluated for wicking using Test Method 2, stain release using Test Method 3, and durability using Test Method 4. Results are listed below in Table 4.

COMPARATIVE EXAMPLE E

The procedure of Comparative Example C was repeated except that melted CARBOWAX (MPEG) 1200 (61 g, 50.8 mmol) was used in combination with the melted fluorinated alcohol (31 g, 64 mmol) of Comparative Example D.

The dispersion was applied to 100% cotton fabric using Test Method 1. The fabric was evaluated for wicking using Test Method 2, stain release using Test Method 3, and durability using Test Method 4. Results are listed below in Table 4.

COMPARATIVE EXAMPLE F

The procedure of Comparative Example D was repeated except that melted CARBOWAX (MPEG) 1200 (80 g, 66.7 mmol) was used in combination with the melted fluorinated alcohol (25 g, 51.3 mmol) of Comparative Example D.

The dispersion was applied to 100% cotton fabric using Test Method 1. The fabric was evaluated for wicking using Test Method 2, stain release using Test Method 3, and durability using Test Method 4. Results are listed below in Table 4.

EXAMPLE 7

To a 500 mL 4-neck flask equipped with an overhead stirrer, condenser with nitrogen inlet, and a temperature probe was added methoxy polyethylene glycol 750 (7.76 g, 10.3 mmol), 3,3,4,4,5,5,6,6,7,7,8,8,8-tridecafluorooctan-1-ol (11.66 g, 32.0 mmol), and DESMODUR N100 (20.0 g, 63% in MIBK, 66.7 mmol). The colorless reaction mixture was heated to 65° C. until the temperature stabilized. To this, 0.8 g TYZOR TPT solution (5% TYZOR TPT in MIBK) was added and the reaction was heated to 95° C. and stirred for 3 hours (the color turned from clear to amber). Deionized water (3.89 g, 216 mmol) and MIBK were added and heated at 95° C. until no isocyanate was detected. The reaction was worked up as described for Example 3 to yield a stable dispersion (12.7% solids, 3.05% F).

The dispersion was applied to 100% cotton fabric using Test Method 1. The fabric was evaluated for wicking using Test Method 2, stain release using Test Method 3, and durability using Test Method 4. Results are listed below in Table 4.

EXAMPLE 8

The experiment was performed as in Example 8 using a magnetic stir bar instead of overhead stirring, methoxy polyethylene glycol 750 (14.12 g, 18.8 mmol), and 3,3,4,4,5,5,6,6,7,7,8,8,8-tridecafluorooctan-1-ol (8.58 g, 23.5 mmol). The dispersion was 15.7% solids and 2.73% F.

The dispersion was applied to 100% cotton fabric using Test Method 1. The fabric was evaluated for wicking using Test Method 2, stain release using Test Method 3, and durability using Test Method 4. Results are listed below in Table 4.

EXAMPLE 9

The experiment was performed as in Example 8 using a magnetic stir bar instead of overhead stirring, methoxy polyethylene glycol 750 (18.89 g, 25.2 mmol), and 3,3,4,4,5,5,6,6,7,7,8,8,8-tridecafluorooctan-1-ol (6.26 g, 17.2 mmol). The dispersion was 19.9% solids and 2.27% F.

The dispersion was applied to 100% cotton fabric using Test Method 1. The fabric was evaluated for wicking using Test Method 2, stain release using Test Method 3, and durability using Test Method 4. Results are listed below in Table 4.

TABLE 4

|  | Example | | | | | |
| --- | --- | --- | --- | --- | --- | --- |
|  | Ex. 7 | Ex. 8 | Ex. 9 | Comp. Ex. D | Comp. Ex. E | Comp. Ex. F |
| *mmol fluorine chain to mmol MPEG | 3.1:1 | 1.2:1 | 0.7:1 | 1.1:1 | 1.3:1 | 0.8:1 |
| Wicking test, sec. | | | | | | |
| Initial | 29 | 8 | 4 | 20 | 10 | 30 |
| 5HW** | 91 | 4 | 2 | 5 | 1 | 15 |
| Stain Release-Initial | | | | | | |
| Mineral oil | 3 | 4 | 3+ | 4 | 4 | 4 |
| Corn Oil | 3 | 4 | 3+ | 4 | 4 | 3 |
| Stain Release-5HW** | | | | | | |
| Mineral Oil | 2+ | 3 | 3 | 4 | 4 | 4 |
| Corn Oil | 4 | 4 | 3 | 4 | 4 | 3 |

*MPEG = methoxy polyethylene glycol (component (c)).
**5HW indicates 5 washing laundry processes per Test Method 4.

The data in Table 4 showed that decreasing the molar ratio of the fluorine component to methoxy polyethylene glycol (MPEG) by increasing the amount of MPEG present relative to the fluorine level in the composition improved the hydrophilicity. When the MPEG was increased in Examples 7 to 9 containing short chain length perfluoroalkyl groups (6 carbons) the hydrophilicity improved. For Comparative Examples D, E and F containing longer chain length perfluoroalkyl groups (predominantly 8 to 12 carbons) the same effect was not observed.

EXAMPLE 10

The experiment was performed as in Example 7 using a magnetic stir bar instead of overhead stirring, methoxy polyethylene glycol 2000 (29.18 g, 14.6 mmol), and 3,3,4,4,5,5,-6,6,7,7,8,8,8-tridecafluorooctan-1-ol (10.12 g, 27.8 mmol). The dispersion was 17.2% solids and 2.09% F.

The dispersion was applied to 100% cotton fabric using Test Method 1. The fabric was evaluated for wicking using Test Method 2, stain release using Test Method 3, and durability using Test Method 4. Results are listed below in Table 5.

EXAMPLE 11

The experiment was performed as in Example 7 using a magnetic stir bar instead of overhead stirring, methoxy polyethylene glycol 2000 (7.98 g, 4.0 mmol), and 3,3,4,4,5,5,-6,6,7,7,8,8,8-tridecafluorooctan-1-ol (13.98 g, 38.4 mmol). The dispersion was 22.8% solids and 5.56% F.

The dispersion was applied to 100% cotton fabric using Test Method 1. The fabric was evaluated for wicking using Test Method 2, stain release using Test Method 3, and durability using Test Method 4. Results are listed below in Table 5.

EXAMPLE 12

The procedure of Example 7 was employed using a magnetic stir bar instead of overhead stirring, methoxy polyethylene glycol 350 (5.11 g, 14.6 mmol), available from Sigma-Aldrich and 3,3,4,4,5,5,6,6,7,7,8,8,8-tridecafluorooctan-1-ol (10.12 g, 27.8 mmol). The dispersion was 9.4% solids and 2.33% F.

The dispersion was applied to 100% cotton fabric using Test Method 1. The fabric was evaluated for wicking using Test Method 2, stain release using Test Method 3, and durability using Test Method 4. Results are listed below in Table 5.

EXAMPLE 13

The procedure of Example 7 was employed using a magnetic stir bar instead of overhead stirring, methoxy polyethylene glycol 350 (8.82 g, 25.2 mmol), and 3,3,4,4,5,5,6,6,7,7,8,8,8-tridecafluorooctan-1-ol (6.26 g, 17.2 mmol). The dispersion was 10.0% solids and 1.51% F.

The dispersion was applied to 100% cotton fabric using Test Method 1. The fabric was evaluated for wicking using Test Method 2, stain release using Test Method 3, and durability using Test Method 4. Results are listed below in Table 5.

EXAMPLE 14

To a 4-neck 500 mL round bottom flask equipped with a thermocouple, condenser with nitrogen inlet, addition funnel, and an overhead stirrer was added 3,3,4,4,5,5,6,6,7,7,8,8,8-tridecafluorooctan-1-ol (14.1 g, 38.7 mmol), methoxy polyethylene glycol 350 (12.6 g, 36 mmol), available from Sigma-Aldrich and DESMODUR N100 (25.6 g, 63% in MIBK, 85.3 mmol). The reaction mass was heated to 55° C. and 1 g of a dibutyltin dilaurate solution (4 mg/gMIBK) was added slowly. The reaction was heated to 90° C. for 3 hours, followed by the addition of 0.8 mL of deionized water and heating until NCO was reacted as detected in Example 3. An additional 90 g of water and 10 g MIBK was added followed by heating at 70° C. for 30 minutes. The material was transferred to a 1 L round bottom flask and the MIBK was removed via distillation to give a stable dispersion (32.1% solids, 6.97% F).

The dispersion was applied to 100% cotton fabric using Test Method 1. The fabric was evaluated for wicking using Test Method 2, stain release using Test Method 3, and durability using Test Method 4. Results are listed below in Table 5.

EXAMPLE 15

The procedure of Example 7 was employed using a magnetic stir bar instead of overhead stirring, methoxy polyethylene glycol 550 (8.02 g, 14.6 mmol), available from Sigma-Aldrich and 3,3,4,4,5,5,6,6,7,7,8,8,8-tridecafluorooctan-1-ol (10.12 g, 27.8 mmol). The dispersion was 9.4% solids and 1.90% F.

The dispersion was applied to 100% cotton fabric using Test Method 1. The fabric was evaluated for wicking using Test Method 2, stain release using Test Method 3, and durability using Test Method 4. Results are listed below in Table 5.

TABLE 5

| | Example | | | | | |
| --- | --- | --- | --- | --- | --- | --- |
| | Ex. 10 | Ex. 11 | Ex. 12 | Ex. 13 | Ex. 14 | Ex. 15 |
| MPEG, MW* | 2000 | 2000 | 350 | 350 | 350 | 550 |
| Molar ratio of fluorine: MPEG | 2:1 | 9.6:1 | 2:1 | 1:1.5 | 1:0.9 | 2:1 |
| Wicking test sec. | | | | | | |
| Initial | 15 | 22 | 57 | 13 | 7 | 26 |
| 5HW** | 1 | 17 | >180 | 7 | 1 | >180 |
| Stain Release-Initial | | | | | | |
| Mineral oil | 5 | 2+ | 3 | 4 | 4 | 4 |
| Corn Oil | 4 | 2 | 3+ | 2 | 5 | 5 |
| Stain Release-5HW** | | | | | | |
| Mineral Oil | 2 | 2 | 1 | 3 | 4+ | 3+ |
| Corn Oil | 5 | 2+ | 3 | 2+ | 4+ | 4 |

*Molecular weight of methoxy polyethylene glycol
**5HW indicates 5 washing laundry processes per Test Method 4.

The data in Table 5 shows that generally the hydrophilicity was increased with the combination of a shorter chain length of the perfluoroalkyl group and the higher molecular weight methoxy polyethylene glycol moieties used for a given molar ratio of fluorine component to MPEG component (see Examples 10, 12 and 16). Furthermore, the molar ratio of fluorine to MPEG contributed to the hydrophilic stain release performance. For MPEG molecular weights of less than about 550 a molar ratio of fluorine to MPEG of less than 2:1 provided better hydrophilicity (see Examples 12, 13, 14 and 16). For higher MPEG molecular weights higher ratios of fluorine to MPEG were also effective.

What is claimed is:

1. In a system for imparting surface properties to fibrous substrates employing a composition consisting of a self-emulsifiable or self-dispersible aqueous solution or dispersion of at least one urea linkage-containing alkoxypolyoxyalkylene fluorocarbamate prepared by contacting (a) at least one polyisocyanate which contains at least three isocyanate groups per molecule, (b) at least one fluorochemical reagent which contains per molecule a single functional group which has at least one reactive Zerewitinoff hydrogen atom and at least two carbon atoms each of which contains at least two fluorine atoms, and (c) at least one hydrophilic, water-solvatable reagent which contains per molecule a single functional group which has at least one reactive Zerewitinoff hydrogen atom, and thereafter with (d) water, the equivalent weight of said polyisocyanate and said reagents (b) and (c) being such that said reagents react with 55% to 95% of said isocyanate groups, and water reacts with all of the remaining isocyanate groups, wherein the improvement comprises consists of use of a fluorochemical reagent of the formula $F(CF_2)_a CH_2CH_2OH$, wherein a is 4, 6, or 8, or mixtures thereof, provided that a is a maximum of 50% of 8, for imparting wicking of moisture, durable hydrophilicity and durable stain release properties to a substrate treated therewith.

2. The system of claim 1 wherein said fluorochemical reagent is a perfluoroalkylethyl alcohol of the formula $F(CF_2)_a CH_2CH_2OH$, wherein a is 4 or 6.

3. The system of claim 1 wherein the fluorochemical reagent is a perfluoroalkylethyl alcohol mixture of the formula $F(CF_2)_a CH_2CH_2OH$, wherein a is predominantly a mixture of 4 or 6.

4. The system of claim 1 wherein the hydrophilic water-solvatable component (c) is at least one ethylene oxide or ethylene oxide/propylene oxide derived polymer of the formula

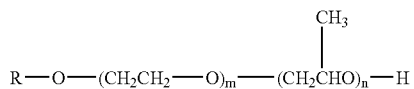

wherein R is a monovalent hydrocarbon radical containing a maximum of six aliphatic or alicyclic carbon atoms, and m and n are the average number of repeating oxyethylene and oxypropylene groups respectively, and m is a positive integer, while n is a positive integer or zero.

5. The system of claim 1 wherein the hydrophilic, water-solvatable reagent (c) is a methoxypolyethylene glycol or mixtures thereof, having an average molecular weight between 350 and 2000.

6. The system of claim 1 wherein when hydrophilic water-solvatable component (c) has a molecular weight of 550 or less, the ratio x:y of fluorochemical reagent (b) to hydrophilic water-solvatable reagent (c) is such that x is a maximum of 2 when y is 1.

7. The system of claim 1 wherein when hydrophilic water-solvatable component (c) has a molecular weight of 750 or less, the ratio x:y of fluorochemical reagent (b) to hydrophilic water-solvatable component (c) is such that x is a maximum of 3 when y is 1.

8. A method of imparting wicking of moisture, durable hydrophilicity and durable stain release to a fibrous substrate comprising contacting said substrate with a composition consisting of a self-emulsifiable or self-dispersible aqueous solution or dispersion of at least one urea linkage-containing alkoxypolyoxyalkylene fluorocarbamate prepared by contacting (a) at least one polyisocyanate which contains at least three isocyanate groups per molecule, (b) a fluorochemical reagent consists of the formula $F(CF_2)_a CH_2CH_2OH$, wherein a is 4, 6, or 8, or mixtures thereof, provided that a is a maximum of 50% of 8, and (c) at least one hydrophilic, water-solvatable reagent which contains per molecule a single functional group which has at least one reactive Zerewitinoff hydrogen atom, and thereafter with (d) water, the equivalent weight of said polyisocyanate and said reagents (b) and (c) being such that said reagents react with 55% to 95% of said isocyanate groups, and water reacts with all of the remaining isocyanate groups.

9. The method of claim 8 wherein the hydrophilic water-solvatable component (c) is at least one ethylene oxide or ethylene oxide/propylene oxide derived polymer of the formula

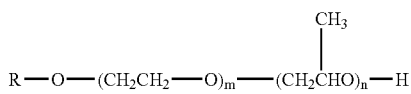

wherein R is a monovalent hydrocarbon radical containing a maximum of six aliphatic or alicyclic carbon atoms, and m and n are the average number of repeating oxyethylene and oxypropylene groups respectively, and m is a positive integer, while n is a positive integer or zero.

10. The method of claim 8 wherein the hydrophilic, water-solvatable reagent (c) is a methoxypolyethylene glycol or mixtures thereof, having an average molecular weight between 350 and 2000.

11. The method of claim 8 wherein the contacting is by brushing, dipping, spraying, padding, roll-coating, or foaming.

12. The method of claim 8 wherein the substrate is fibers, yarns, fabrics, filaments, textiles or carpets.

13. A substrate treated with a composition consisting of a self-emulsifiable or self-dispersible aqueous solution or dispersion of at least one urea linkage-containing alkoxypolyoxyalkylene fluorocarbamate prepared by contacting (a) at least one polyisocyanate which contains at least three isocyanate groups per molecule, (b) a fluorochemical reagent consists of the formula $F(CF_2)_a CH_2CH_2OH$, wherein a is 4, 6, or 8, or mixtures thereof, provided that a is a maximum of 50% of 8, and (c) at least one hydrophilic, water-solvatable reagent which contains per molecule a single functional group which has at least one reactive Zerewitinoff hydrogen atom, and thereafter with (d) water, the equivalent weight of said polyisocyanate and said reagents (b) and (c) being such that said reagents react with 55% to 95% of said isocyanate groups, and water reacts with all of the remaining isocyanate groups, said substrate having wicking of moisture, durable hydrophilicity and durable stain release.

14. The substrate of claim 13 wherein the hydrophilic, water-solvatable reagent (c) is a methoxypolyethylene glycol or mixtures thereof, having an average molecular weight between 350 and 2000.

15. The substrate of claim 13 comprising fibers, yarns, fabrics, filaments, textiles or carpets.

* * * * *